(12) United States Patent
Mhatre et al.

(10) Patent No.: US 7,830,848 B2
(45) Date of Patent: Nov. 9, 2010

(54) NETWORK-WIDE CLEAR CHANNEL ASSESSMENT THRESHOLD

(75) Inventors: Vivek Mhatre, Kalwa (IN); Konstantina Papagiannaki, Pittsburgh, PA (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 11/789,525

(22) Filed: Apr. 25, 2007

(65) Prior Publication Data

US 2008/0267079 A1 Oct. 30, 2008

(51) Int. Cl.
*H04W 4/00* (2009.01)

(52) U.S. Cl. .................. 370/338; 370/241; 370/252; 455/7; 455/68; 455/69

(58) Field of Classification Search .................. 370/406, 370/252, 238; 455/525, 69
See application file for complete search history.

(56) References Cited

U.S. PATENT DOCUMENTS

| 7,554,998 | B2* | 6/2009 | Simonsson et al. | .......... 370/406 |
| 2003/0207699 | A1* | 11/2003 | Shpak | ........................ 455/525 |

\* cited by examiner

*Primary Examiner*—Kent Chang
*Assistant Examiner*—Ronald Eisner
(74) *Attorney, Agent, or Firm*—Lee & Hayes, PLLC

(57) ABSTRACT

Overall network throughput may be increased in a wireless network through a common network-wide clear channel assessment (CCA) threshold. Each access point performs measurements, and determines suitable CCA thresholds and throughput estimates for each data rate. Results are reported to a central controller that determines the network-wide CCA threshold. The network-wide CCA threshold is then used by all access points and mobile stations.

13 Claims, 3 Drawing Sheets

NETWORK-WIDE CLEAR CHANNEL ASSESSMENT THRESHOLD

FIELD

The present invention relates generally to wireless networks, and more specifically to the setting of the clear channel assessment threshold parameter within wireless network nodes.

BACKGROUND

Wireless networks are becoming ubiquitous, and the density of wireless networks is increasing. For example, in enterprise and campus settings, high density (HD) wireless local area networks (HD-WLAN) with access point distances of 10-20 meters will soon become common. In such networks, interference is the deciding factor in determining the network-wide throughput performance. Tuning of certain medium access control (MAC) parameters may have an effect on the performance of individual access points as well as network-wide throughput. For example, the clear channel assessment (CCA) threshold may have an effect on network-wide throughput.

Typical CCA mechanisms include sampling the net radio frequency (RF) energy on a channel and comparing it to a threshold prior to initiating channel access. A network node (e.g., access point or mobile station) initiates channel access only if the sampled RF energy is lower than the CCA threshold. The value of the CCA threshold can have a significant impact on network performance. If set too high, the network node may transmit when it should not (e.g., the node's transmissions lead to unacceptable added interference with ongoing transmissions, degrading the aggregate throughput). If the CCA threshold is set too low, a network node may pass up opportunities to transmit when it could have without interfering with others, thereby again degrading network performance.

DESCRIPTION OF EMBODIMENTS

Figure 1:
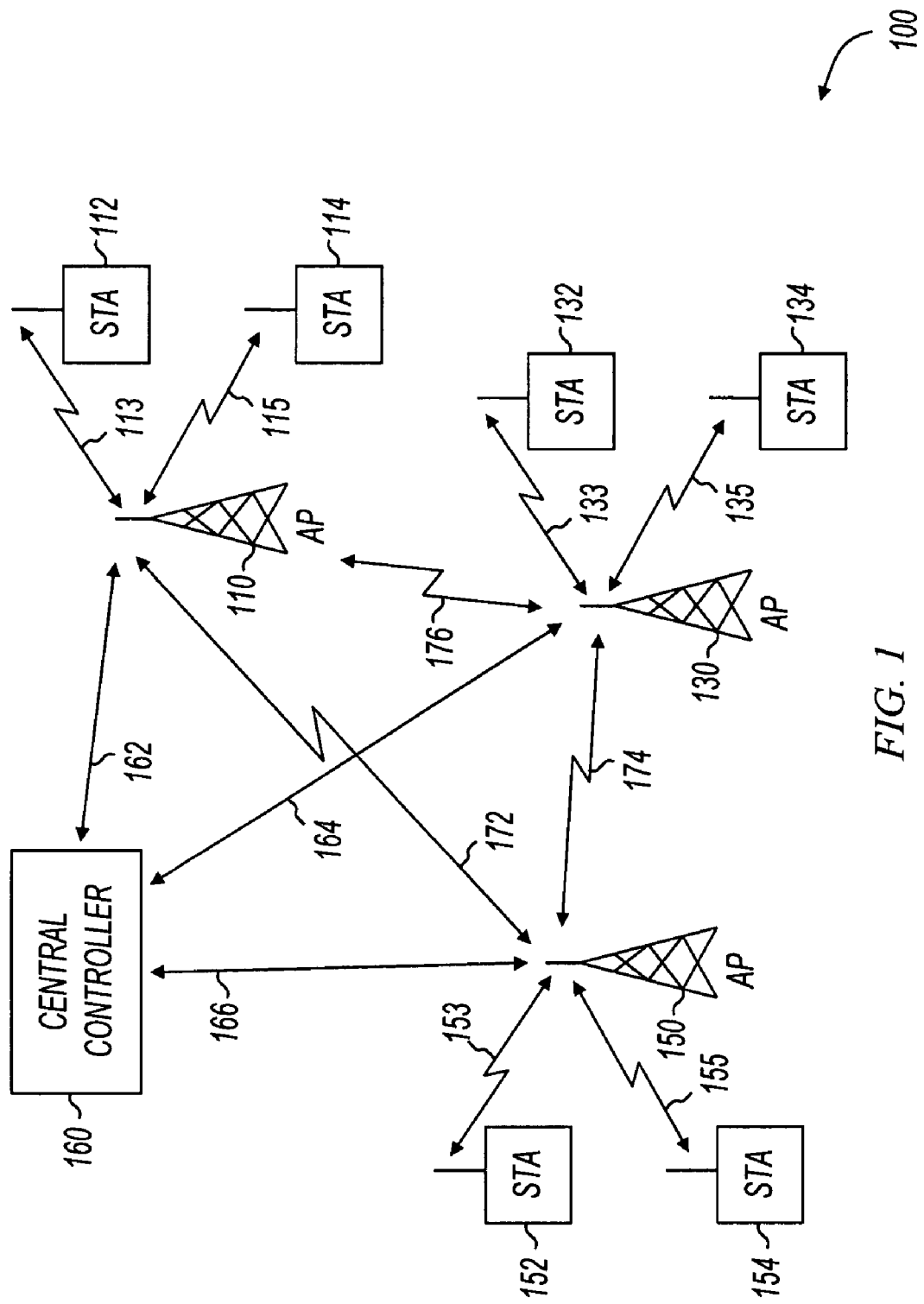
FIG. 1 shows a wireless network with multiple access points and a central controller.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a wireless network with multiple access points and a central controller. Network 100 includes access points (APs) 110, 130, and 150, mobile stations (STAs) 112, 114, 132, 134, 152, and 154, and central controller 160. In some embodiments, wireless network 100 is a wireless local area network (WLAN). For example, the mobile stations and/or access points may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. The mobile stations shown in FIG. 1 may be any type of mobile station capable of communicating in network 100. For example, the mobile stations may be computers, personal digital assistants, wireless-capable cellular phones, home audio or video appliances, or the like.

Mobile stations 112 and 114 are associated with access point 110; mobile stations 132 and 134 are associated with access point 130; and mobile stations 152 and 154 are associated with access point 150. Access point 150 is shown using signals 153 and 155 to communicate with mobile stations; access point 130 is shown using signals 133 and 135 to communicate with mobile stations; and access point 110 is shown using signals 113 and 115 to communicate with mobile stations. When the access points are in close proximity, each access point also receives signals transmitted by other access points. These signals are shown at 172, 174, and 176. Signals 172, 174, and 176 may carry useful information to a receiving access point, however, they may also be considered to be interference when an access point is attempting to communicate with a mobile station. For example, a receiving access point may receive beacons from another access point and extract useful information from the beacon. Also for example, when an access point is attempting to communicate with its associated mobile stations, transmissions from other access points contribute to channel noise.

Central controller 160 may be any type of device capable of performing the actions described herein. For example, central controller 160 may be a computer, an access point, or the like. Access points communicate with central controller 160 using signals 162, 164, and 166. This communication may take place on any medium. For example, the access points may be wired to the central controller, and communications may take place over a wired connection. Also for example, the access points may have wireless connections to the central controller, and communications may be wireless.

Various embodiments of the present invention provide systems and methods for tuning the clear channel assessment threshold (CCA) parameter of an 802.11 wireless local area network. The CCA threshold parameter has a key role to play in high density wireless networks where mobile stations and access points experience substantial interference from each other. The various embodiments of the present invention tune the CCA threshold of the network so as to increase the network-wide throughput. Local measurements are made at the access points, and based on these measurements the access points report their optimum rate and CCA threshold to the central controller. The central controller then determines the network-wide CCA threshold after performing some computations, and this CCA threshold is used by all the mobile stations and access points in the network.

Each access point measures the received signal strength (RSS) of its associated mobile stations, and then determines the station that has the highest path loss. The channel gain of this station is used by the access point to calibrate its CCA threshold, and determine the projected throughput of this cell for this choice of CCA threshold. This is done for each possible data rate. For example, in 802.11 embodiments, this is done for each of the eight discrete rates of 802.11. The calibrated CCA thresholds are then reported to the central controller. The actions performed by each access point are further described below with reference to FIG. 2. The central controller chooses the network-wide CCA threshold based on the reports that it receives from all the access points in the network, so as to increase the network throughput.

Figure 2:
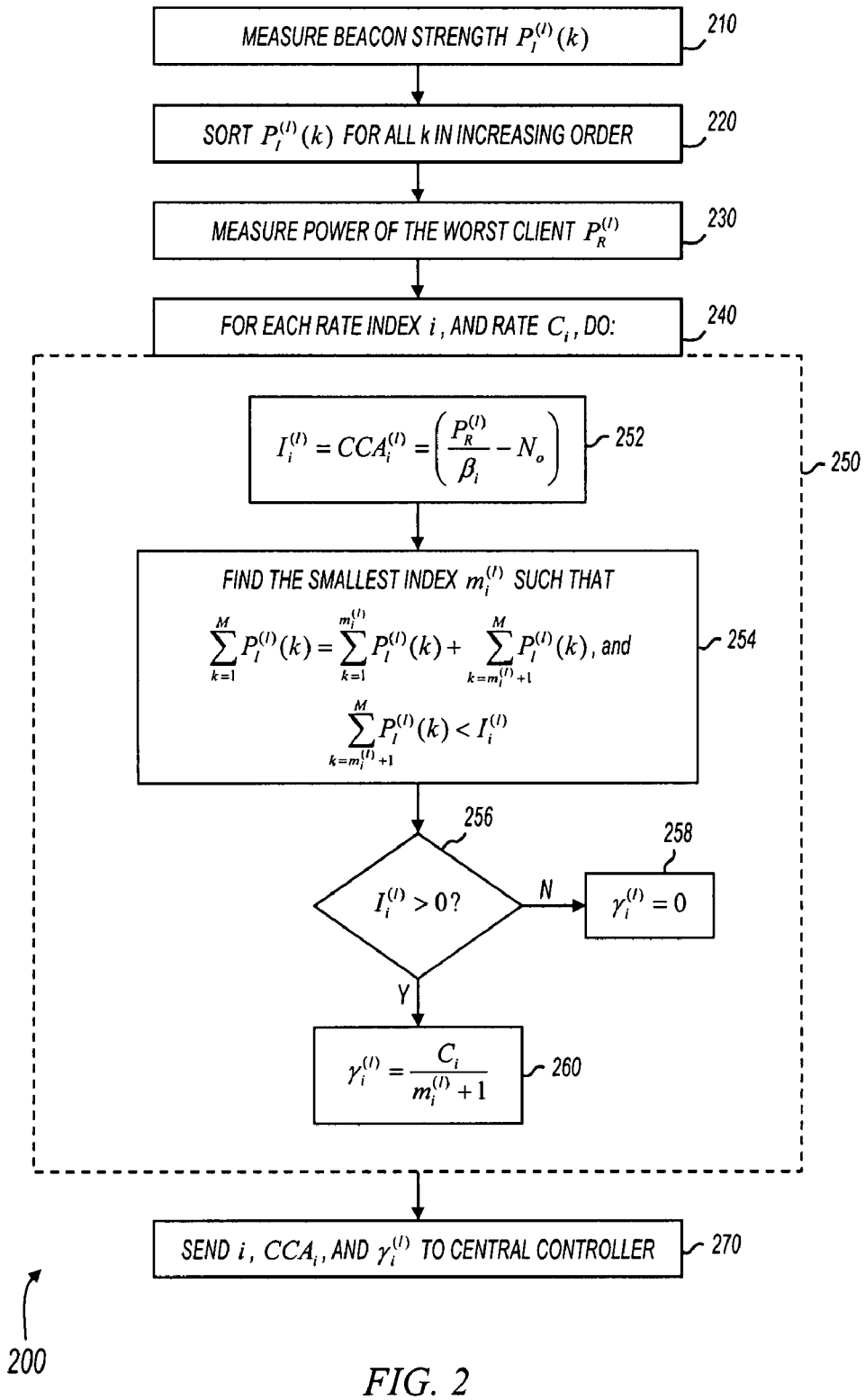
FIG. 2 shows a flowchart in accordance with various embodiments of the present invention.

FIG. 2 shows a flowchart in accordance with various embodiments of the present invention. In some embodiments, method 200 may be used in, or for, a wireless system that includes a central controller for determining a network-wide CCA threshold. In some embodiments, method 200, or portions thereof, is performed by a wireless network access point, embodiments of which are shown in the various figures. In other embodiments, method 200 is performed by a processor or electronic system. Method 200 is not limited by the particular type of apparatus or software element performing the method. The various actions in method 200 may be performed in the order presented, or may be performed in a different order. Further, in some embodiments, some actions listed in FIG. 2 are omitted from method 200.

Method 200 is performed by each access point in a wireless network. For example, method 200 is performed by each access point l, where l may range from 1 to M (total number of APs). After performing method 200, each access point reports findings to the central controller, and the central controller distributes the CCA threshold to be used network-wide. In some embodiments, method 200 is performed by access points when instructed by the central controller. In other embodiments, method 200 is performed on a periodic basis. The network-wide CCA threshold may be periodically updated.

Method 200 is shown beginning at block 210 in which an access point measures the power of beacons received from other access points within range. $P_I^{(l)}(k)$ is the power received by AP l from AP k, where k ranges from 1 to M (total number of APs). At 220, the $P_I^{(l)}(k)$ values are sorted in decreasing order. If AP l does not receive any beacons from another AP k then $P_{II}^{(l)}(k)=0$.

At 230, the access point measures the power of the worst client (associated mobile station). $P_R^{(l)}$ is the power received by AP l from its worst client. This power would correspond to the client that is located at the edge of the cell if symmetry in power is assumed (the power received by the client from the AP is also the lowest in the cell).

Block 240 shows that the actions within block 250 are performed for each rate index i, corresponding to each supportable data rate $C_i$. In block 252, each AP l determines one value $I_i^{(l)}$ per supported rate that represents the maximum amount of interference it can experience for each rate $C_i$. This value is determined using the power received from the worst client $P_R^{(l)}$, the minimum power $\beta_i$ required to support rate $C_i$, and the noise power $N_o$. The signal-to-interference-plus-noise ration (SINR) at the client needs to exceed $\beta_i$ in order for the communication to be sustainable at rate $C_i$. $I_i^{(l)}$ will be smaller than zero if the user cannot be served at rate i by AP l.

In block 254, the smallest index $m_i^{(l)}$ is found that satisfies the formula shown. The formula tries to identify the smallest number of APs that would need to be suppressed such that the remaining APs can still emit at their nominal power but not interfere with AP l, since their cumulative power is less than the allowable interference at the edge of the cell, $I_i^{(l)}=CCA_i^{(l)}$.

The throughput that can be achieved at rate i from AP l is represented by $\gamma_i^{(l)} \cdot \gamma_i^{(l)}$ is modeled by $$\frac{C_i}{m_i^{(l)} + 1}$$

when $I_i^{(l)}$ is greater than zero, and is set to zero when $I_i^{(l)}$ is not greater than zero. At 270, AP l sends the triplet ($\gamma_i^{(l)}$, i, $CCA_i^{(l)}$) for each rate index i to the central controller. The central controller receives one triplet per rate index from each access point.

The central controller determines the network-wide common CCA threshold, CCA*, as follows. Let the highest supportable rate for the AP with a CCA threshold of CCA* be i(l). Since the central controller knows $CCA_{i(l)}^{(l)}$, it determines the best CCA* such that $CCA^*>CCA_{i(l)}^{(l)}$, and the following network-wide total throughput is maximized.

$$NetworkThroughput = \sum_{1}^{M} \gamma_{i(l)}^{(l)}$$

The above maximization is achieved through an exhaustive search over eight rates of M APs (at the most 8 M combinations), and the optimum CCA threshold is then propagated back to all the APs.

Figure 3:
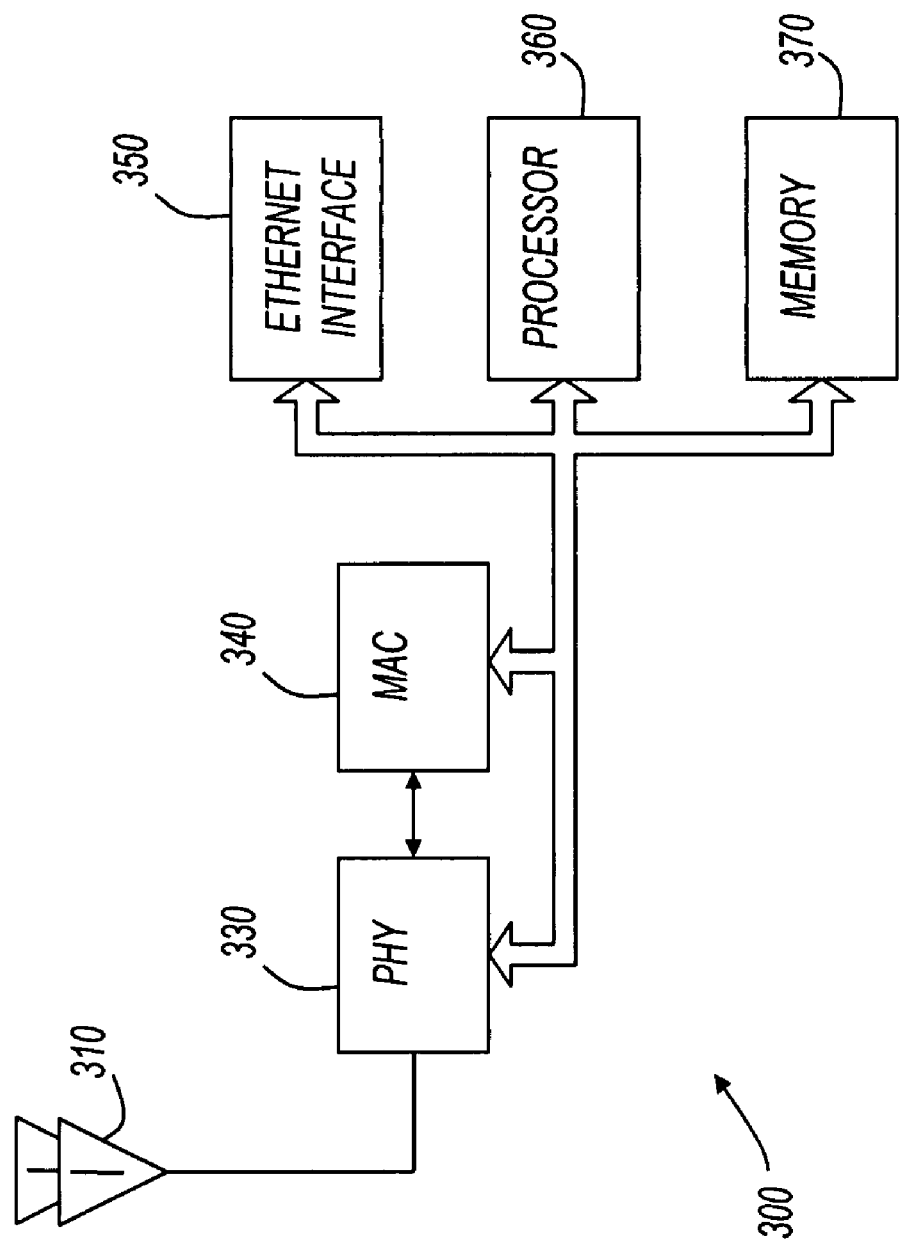
FIG. 3 shows an electronic system in accordance with various embodiments of the present invention.

FIG. 3 shows a system diagram in accordance with various embodiments of the present invention. Electronic system 300 includes antennas 310, physical layer (PHY) 330, media access control (MAC) layer 340, Ethernet interface 350, processor 360, and memory 370. In some embodiments, electronic system 300 may be an access point that performs the actions described above with reference to the previous figures. For example, electronic system 300 may be utilized in a wireless network as one of access points 110, 130, or 150 (FIG. 1). Also for example, electronic system 300 may be a central controller capable of determining a network-wide CCA threshold.

In some embodiments, electronic system 300 may represent a system that includes an access point, a mobile station, or a central controller as well as other circuits. For example, in some embodiments, electronic system 300 may be a computer, such as a personal computer, a workstation, or the like, that includes an access point or mobile station as a peripheral or as an integrated unit. Further, electronic system 300 may include a series of access points that are coupled together in a network.

In operation, system 300 sends and receives signals using antennas 310, and the signals are processed by the various elements shown in FIG. 3. Antennas 310 may be an antenna array or a single antenna. For example, in some embodiments, antennas 310 includes a single antenna. Also for example, in some embodiments, antennas 310 includes an array of antennas, and system 300 supports multiple-input-multiple-output (MIMO) or sectorized processing. System 300 may operate in partial compliance with, or in complete compliance with, a wireless network standard such as an 802.11 standard.

Physical layer (PHY) 330 is coupled to antennas 310 to interact with a wireless network. PHY 330 may include circuitry to support the transmission and reception of radio frequency (RF) signals. For example, in some embodiments, PHY 530 includes an RF receiver to receive signals and perform "front end" processing such as low noise amplification (LNA), filtering, frequency conversion or the like. Further, in some embodiments, PHY 330 includes transform mechanisms and beamforming circuitry to support MIMO signal processing and/or sectorized processing. Also for example, in some embodiments, PHY 330 includes circuits to support frequency up-conversion, and an RF transmitter.

Media access control (MAC) layer 340 may be any suitable media access control layer implementation. For example, MAC 340 may be implemented in software, or hardware or any combination thereof. In some embodiments, a portion of MAC 340 may be implemented in hardware, and a portion may be implemented in software that is executed by processor 360. Further, MAC 340 may include a processor separate from processor 360.

In operation, processor 360 reads instructions and data from memory 370 and performs actions in response thereto. For example, processor 360 may access instructions from memory 370 and perform method embodiments of the present invention, such as method 200 (FIG. 2) or methods described with reference to other figures. Processor 360 represents any type of processor, including but not limited to, a microprocessor, a digital signal processor, a microcontroller, or the like.

Memory 370 represents an article that includes a machine readable medium. For example, memory 370 represents a random access memory (RAM), dynamic random access memory (DRAM), static random access memory (SRAM), read only memory (ROM), flash memory, or any other type of article that includes a medium readable by processor 360. Memory 370 may store instructions for performing the execution of the various method embodiments of the present invention. Memory 370 may also store beamforming matrices or beamforming vectors.

Although the various elements of system 300 are shown separate in FIG. 3, embodiments exist that combine the circuitry of processor 360, memory 370, Ethernet interface 350, and MAC 340 in a single integrated circuit. For example, memory 370 may be an internal memory within processor 360 or may be a microprogram control store within processor 360. In some embodiments, the various elements of system 300 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 350 may provide communications between electronic system 300 and other systems. For example, in some embodiments, electronic system 300 may be a desktop computer that utilizes Ethernet interface 350 to communicate with a wired network or to communicate with other computers. Some embodiments of the present invention do not include Ethernet interface 350. For example, in some embodiments, electronic system 300 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   measuring beacon strength of access points within range;
   measuring received power of the farthest mobile station;
   determining suitable clear channel assessment thresholds for each supported data rate;
   reporting the suitable clear channel assessment thresholds to a central controller;
   modeling the throughput at each supported data rate, wherein modeling the throughput comprises:

$$\gamma_i = \frac{C_i}{m_i + 1}$$

where $\gamma_i$ is the throughput, i is the data rate index, $C_i$ is the supported data rate, and $m_i$ is smallest value such that:

$$\sum_{k=1}^{M} P_I(k) = \sum_{k=1}^{m_i} P_I(k) + \sum_{k=m_i+1}^{M} P_I(k), \text{ and } \sum_{k=m_i+1}^{M} P_I(k) < CCA_i$$

where $P_I(k)$ is the beacon strength of access point k, M is the number of access points, and $CCA_i$ is the suitable clear channel assessment threshold for data rate i; and
   reporting the throughput for each supported data rate to the central controller.

2. The method of claim 1 further comprising:
   determining at a central controller a network-wide clear channel assessment threshold from throughput and suitable clear channel assessment thresholds for each supported data rate received from a plurality of access points.

3. The method of claim 2 further comprising reporting the network-wide clear channel assessment threshold to the plurality of access points.

4. The method of claim 1 further comprising receiving a network-wide clear channel assessment threshold from the central controller.

5. A central controller in a wireless network to receive suitable clear channel assessment thresholds and throughput estimates for each supported data rate from a plurality of access points, and to determine a network-wide clear channel assessment threshold, wherein the central controller maximizes the value of network throughput $$NetworkThroughput = \sum_{1}^{M} \gamma_{i(l)}^{(l)}$$

where i(l) represents the highest supportable data rate for AP 1 with the network-wide clear channel assessment threshold, and $\gamma_{i(l)}^{(l)}$ represents the throughput of AP 1 using the network-wide clear channel threshold, and M represents the number of access points.

6. The central controller of claim 5 wherein the central controller comprises an access point.

7. The central controller of claim 5 comprising a wireless network connection over which to receive the suitable clear channel assessment thresholds and throughput estimates for each supported data rate from the plurality of access points.

8. The central controller of claim 5 comprising a wired network connection over which to receive the suitable clear channel assessment thresholds and throughput estimates for each supported data rate from the plurality of access points.

9. A method comprising:
measuring beacon strength of access points within range;
measuring received power of the farthest mobile station;
determining suitable clear channel assessment thresholds for each supported data rate, wherein determining the clear channel assessment threshold for each supported data rate comprises:

$$CCA_i = \left(\frac{P_R}{\beta_i} - N_o\right)$$

where i is the supported data rate index, $P_R$ is the received power of the farthest mobile station, $\beta_i$ is the minimum power required to support the data rate, and $N_o$ is the noise power;
reporting the suitable clear channel assessment thresholds to a central controller;
modeling the throughput at each supported data rate; and
reporting the throughput for each supported data rate to the central controller.

10. The method of claim 9 wherein modeling the throughput comprises:

$$\gamma_i = \frac{C_i}{m_i + 1}$$

where $\gamma_i$ is the throughput, i is the data rate index, $C_i$ is the supported data rate, and $m_i$ is smallest value such that:

$$\sum_{k=1}^{M} P_I(k) = \sum_{k=1}^{m_i} P_I(k) + \sum_{k=m_i+1}^{M} P_I(k), \text{ and } \sum_{k=m_i+1}^{M} P_I(k) < CCA_i$$

where $P_I(k)$ is the beacon strength of access point k, M is the number of access points, and $CCA_i$ is the suitable clear channel assessment threshold for data rate i.

11. The method of claim 9 further comprising:
determining at a central controller a network-wide clear channel assessment threshold from throughput and suitable clear channel assessment thresholds for each supported data rate received from a plurality of access points.

12. The method of claim 11 further comprising reporting the network-wide clear channel assessment threshold to the plurality of access points.

13. The method of claim 9 further comprising receiving a network-wide clear channel assessment threshold from the central controller.

* * * * *